United States Patent [19]
Yoshizumi

[11] Patent Number: 5,315,374
[45] Date of Patent: May 24, 1994

[54] THREE-DIMENSIONAL MEASURING APPARATUS

[75] Inventor: Keiichi Yoshizumi, Osaka, Japan

[73] Assignee: Matsushita Electric Industrial Co., Ltd., Osaka, Japan

[21] Appl. No.: 948,592

[22] Filed: Sep. 23, 1992

[30] Foreign Application Priority Data

Sep. 27, 1991 [JP] Japan .................. 3-248830

[51] Int. Cl.$^5$ .............................. G01B 11/24
[52] U.S. Cl. ...................... 356/376; 250/201.4
[58] Field of Search ............... 356/371, 375, 376; 250/201.2, 201.3, 201.4

[56] References Cited

U.S. PATENT DOCUMENTS

| | | | |
|---|---|---|---|
| 2,897,722 | 8/1959 | Gunter et al. | |
| 4,212,537 | 7/1980 | Golob et al. | 356/73.1 |
| 4,488,277 | 12/1984 | McFarlane et al. | 369/58 |
| 4,766,585 | 8/1988 | Fukumoto et al. | 369/122 |

FOREIGN PATENT DOCUMENTS

| | | | |
|---|---|---|---|
| 47-18787 | 5/1972 | Japan | 356/375 |
| 2-134506 | 5/1990 | Japan . | |
| 3-105202 | 5/1991 | Japan | 250/201.2 |

OTHER PUBLICATIONS

"Optical Profilometer: A New Method for High Sensitivity and Wide Dynamic Range", Fainman et al., Applied Optics/vol. 21, No. 17/1 Sep. 1982.

Frosch et al, IBM Technical Disclosure Bulletin, vol. 15, No. 2, Jul. 1972, pp. 504–505.

Primary Examiner—F. L. Evans
Attorney, Agent, or Firm—Wenderoth, Lind & Ponack

[57] ABSTRACT

A three-dimensional measuring apparatus has an optical probe built therein The optical probe includes a laser source onto a surface to be measured, a beam laser source, an objective lens for condensing a light from splitter for separating from an incident optical path a laser light reflected from the surface to be measured, a non-polarizing beam splitter for separating a separated light into two separated lights by a fixed separating ratio, independent of a direction of polarization, a first pin hole provided in front of a condensing point of one of the two separated lights separated by the non-polarizing beam splitter, a first photodetector for receiving the light passing through the first pin hole, a second pin hole provided in the rear of a condensing point of the other of the two separated lights separated by the non-polarizing beam splitter, a second photodetector for receiving the light passing through the second pin hole, and a driving means for driving the objective lens by a difference of outputs between the first and second photodetectors as an error signal for automatic focus control. Thus, the optical probe is free of focusing errors even if the inclining direction of the surface to be measured is changed.

5 Claims, 5 Drawing Sheets

THREE-DIMENSIONAL MEASURING APPARATUS

BACKGROUND OF THE INVENTION

The present invention relates to a three-dimensional measuring apparatus having an optical probe built therein for measuring the three-dimensional shape of a curved face such as an aspherical lens or the like in a non-contacting manner with superhigh accuracy.

The simplest three-dimensional measuring apparatus incorporating an optical probe is equipped with a microscope as a probe. The microscope is moved to a position where an image is monitored most clearly, and the x, y, and z coordinates at the position are read. The measuring apparatus of this type has the drawbacks, for example, that an image is not clearly found at a point of an error in focal depth or at a smooth surface without a flaw such as a lens surface. Even a measuring apparatus with an auto-focusing function based on an optical trigonometrical measurement cannot measure an inclined surface.

In a focus adjusting optical system disclosed in U.S. Pat. No. 2,897,722, the light is condensed at a surface to be measured and the reflecting light from the surface is divided into two by a beam splitter. The difference of the quantities of light passing through pin holes provided in front of and to the rear of (behind) the focal point is used as an error signal for focus adjustment. Accordingly, the prior system makes it possible to measure an inclined surface inclined in an optional direction. Nevertheless, errors occur with the prior art system, depending on the inclining direction of the surface.

That is, in the focus adjusting method of U.S. Pat. No. 2,897,722, since the direction of light passing through the beam splitter differs depending on the inclining direction of the surface to be measured, the separating or dividing ratio of light is changed according to the focus adjusting method disclosed in U.S. Pat. No. 2,897,722. This results in the focal point being different for different inclining directions of the surface to be measured, thus causing a measuring error.

Another prior art shape measuring apparatus, revealed in Japanese Laid-open Patent Publication No. 2-134506 by one of the inventors of the present invention, utilizes a focus controlling method which is capable of controlling an optical probe supported by a coil spring with considerably high accuracy, i.e., within approximately 0.01 $\mu$m to the focus in about 20 mm range in the z-axis direction by means of a linear motor.

However, the following disadvantages are inherent in the structure of the shape measuring apparatus of Japanese Laid-open Patent Publication No. 2-134506, wherein a linear motor for driving the optical probe is arranged above an optical probe and a coil spring is arranged above the linear motor:

(1) It is desirable that the driving position of the linear motor is in the vicinity of the center of the z-axis movable section. Otherwise, during driving of the linear motor the torque for rotating the movable section worsens the moving perpendicularity in the z-axis direction. If the moving perpendicularity in the z-axis direction is poor, the measuring accuracy is deteriorated and the focus controlling efficiency is lowered. Although it is better to support the supporting spring at the center of gravity thereof, the prior art structure cannot realize this.

(2) It is difficult to extend the movable range in the z-axis direction of the optical probe so as to obtain a larger measuring area, because the space is too limited to provide a magnetic circuit of a length not smaller than the movable range of the linear motor.

Moreover, in the above shape measuring apparatus, the optical probe of the shape measuring apparatus is supported by the coil spring, and the tension of the coil spring is changed due to the expansion/contraction thereof in accordance with the movement of the optical probe, thus bringing about errors in focus servo. Moreover, if the movable range of the optical probe in the z-axis direction is increased, it causes the optical probe to become unable to track the focal point.

SUMMARY OF THE INVENTION

A first object of the present invention is to provide a three-dimensional measuring apparatus capable of preventing an erroneous measurement from occurring.

A second object of the present invention is to provide a three-dimensional measuring apparatus capable of improving a moving perpendicularity of an optical probe in a z-axis direction to increase its measuring accuracy and improve its focus controlling efficiency, and extending its movable range in the z-axis direction.

A third object of the present invention is to provide a three-dimensional measuring apparatus capable of preventing the tension of the coil spring for supporting the optical probe from being changed due to its expansion/contraction.

In accomplishing these and other objects, according to one aspect of the present invention, there is provided a three-dimensional measuring apparatus having an optical probe built therein, the optical probe comprising: a laser source; an objective lens for condensing a light from the laser source onto a surface to be measured; a beam splitter for separating from an incident optical path a laser light reflected from the surface to be measured; a non-polarizing beam splitter for separating a separated light into two separated lights by a fixed separating ratio, independent of a direction of polarization; a first pin hole provided in front of a condensing point of one of the two separated lights separated by the non-polarizing beam splitter; a first photodetector for receiving the light passing through the first pin hole; a second pin hole provided in the rear of a condensing point of the other of the two separated lights separated by the non-polarizing beam splitter; a second photodetector for receiving the light passing through the second pin hole; and a driving means for driving the objective lens in accordance with a difference in outputs between the first and second photodetectors as an error signal for automatic focus control.

By the above construction of the one aspect of the present invention, since the apparatus has the non-polarizing beam splitter for separating the separated light into the two separated lights by the fixed separating ratio, independent of the direction of polarization, the separating ratio of light is not changed even when the direction of light passing through, a non-polarizing beam splitter is changed. Therefore, generation of measuring errors is suppressed remarkably even if the inclining direction of the surface to be measured is changed.

According to another aspect of the present invention, there is provided the three-dimensional measuring apparatus as described above, further comprising: a z-axis guide for guiding the optical probe in a z-axis direction;

wherein the driving means includes a linear driving means having coils mounted on both sides of the optical probe and generating a linear driving force in the z-axis direction when a current is fed to the coils so as to linearly move the optical probe guided by the z-axis guide in the z-axis direction; and a control means for feeding to the coils a control current corresponding to the error signal.

By the above construction of the one aspect of the present invention, since the coils of the linear driving means such as a linear motor are mounted on both sides of the optical probe, the center of the driving force of the linear driving means can be brought to the vicinity of the center of gravity of the z-axis movable section. Therefore, there the optical probe is not subjected to rotary torque, thereby enhancing the focusing accuracy and the perpendicularity in the z-axis direction, and also increasing the stroke in the z-axis direction.

According to a further aspect of the present invention, there is provided the three-dimensional measuring apparatus as described in the first aspect of the present invention, further comprising: a z-axis guide for guiding the optical probe in a z-axis direction; and a constant force spring for supporting the optical probe and generating a tension approximately equal to a weight of the optical probe over a movable range of the optical probe guided by the z-axis guide.

By the above construction of the one aspect of the present invention, since the optical probe can be supported by a fixed supporting force over the large movable range in the z-axis direction, easy and highly accurate control of the focus is possible. When two constant force springs can be faced to each other, no tension is generated in directions other than the z-axis direction, so that the moving perpendicularity in the z-axis direction is highly accurate.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

Figure 1:
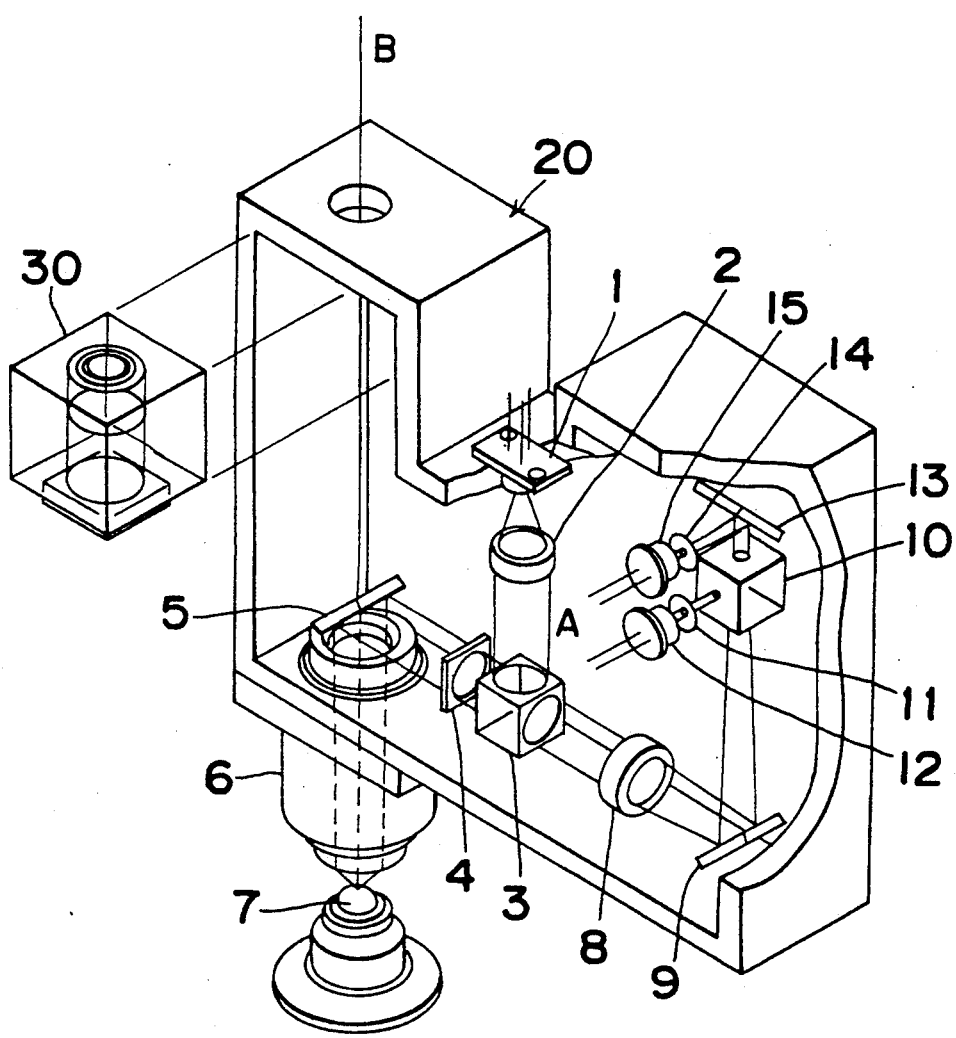
FIG. 1 is a diagram showing the structure of an optical system of an optical probe in a three-dimensional measuring apparatus of the present invention.

Before the description of the present invention proceeds, it is to be noted that like parts are designated by like reference numerals throughout the accompanying drawings.

FIG. 1 shows an optical system of an optical probe in a three-dimensional measuring apparatus according to a preferred embodiment of the present invention. In the optical system of FIG. 1, the laser light emitted from a semiconductor laser 1 is caused to be an approximately parallel beam by a lens 2, and is totally reflected by a polarization beam splitter 3 since the parallel beam is an S-polarized wave with respect to the reflected surface of the polarization beam splitter 3, and thus the reflected beam passes through a λ/4 wavelength plate 4 to become a circularly polarized wave. The circularly polarized wave is then totally reflected by a wave dividing mirror 5 and condensed on a surface to be measured 7 by an objective lens 6. The laser light reflected from the measuring surface 7 is linearly polarized by the λ/4 wavelength plate 4 through the objective lens 6. The direction of polarization is shifted 90° from that of the incident light. Therefore, the linearly polarized wave fully penetrates through the polarization beam splitter 3, is condensed by a lens 8, reflected by a mirror 9, and divided into two waves by a non-polarizing beam splitter 10. One of the two divided waves, that is, the light reflecting from the non-polarizing beam splitter 10 is, after passing through a pin hole 11 of a member arranged in front of a condensing position, detected by a photodetector 12. On the other hand, the other of the two divided waves, that is, the light passing through the non-polarizing beam splitter 10 is reflected by a mirror 13, penetrates a pin hole 14 of a member provided in the rear of a condensing position, and is received by a photodetector 15.

When the position of the measuring surface 7 is shifted forward or backward from a focal point, the condensing positions in front of and in the rear of the pin holes are shifted as thus bringing about the difference in the quantities of the light penetrating the pin holes. The optical probe 20 is moved up and down so as to make the difference zero at all times. At this time, only the objective lens 6, and not the optical probe, can be moved up and down so as to make the difference zero at all times. In FIG. 1, an optical path of the semiconductor laser 1 is indicated by (A) and that of a Helium-Neon Zeeman laser for measuring the z-axis coordinates is represented by (B).

Figure 2:
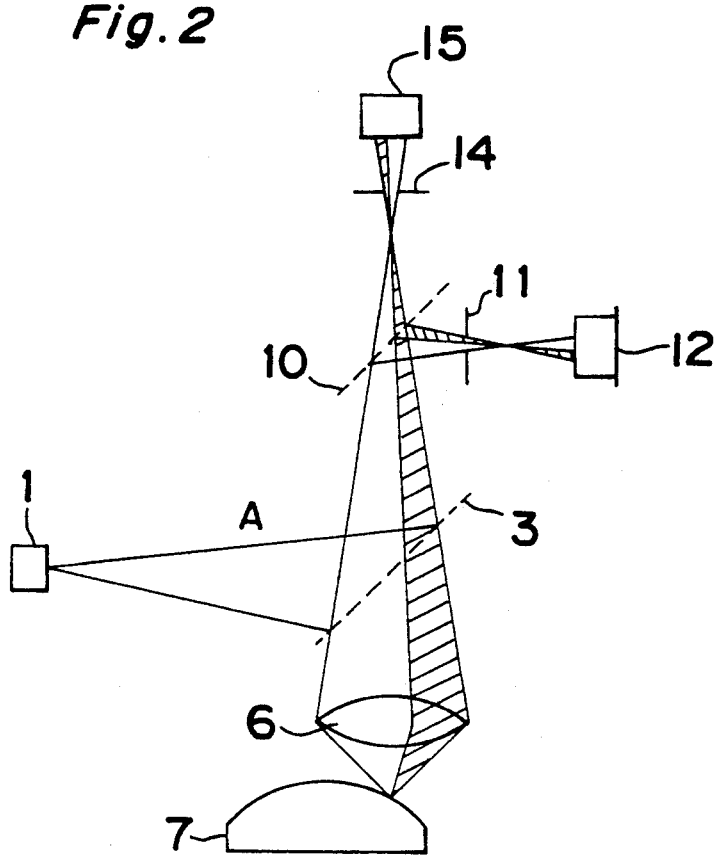
FIG. 2 is a simplified diagram of the optical system of FIG. 1.

FIG. 2 is a simplified diagram of the optical system of the optical probe 20 of FIG. 1. The reflecting light proceeds along an optical path indicated by oblique lines in whichever direction the measuring surface 7 is inclined, thus generating a focus error signal. However, if the beam splitter 10 is a normal half mirror the separating ratio of which is different by the direction of polarization, the separating ratio is varied also depending on the inclining direction of the measuring surface 7. Therefore, focusing errors are generated by the inclination of the measuring surface 7. By contrast, when the beam splitter 10 is a non-polarizing beam splitter as used in the present embodiment, the separating ratio is not changed by the inclining direction of the measuring surface 7, without focusing errors generated from the inclination of the measuring surface 7.

Figure 3:
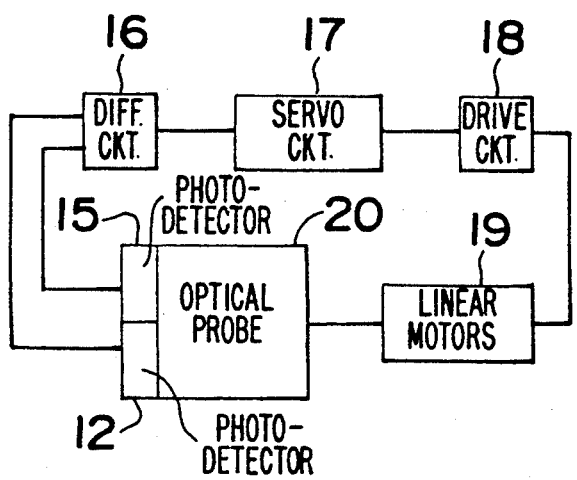
FIG. 3 is a structural block diagram of a control system of the three-dimensional measuring apparatus of the present invention.
Figure 4:
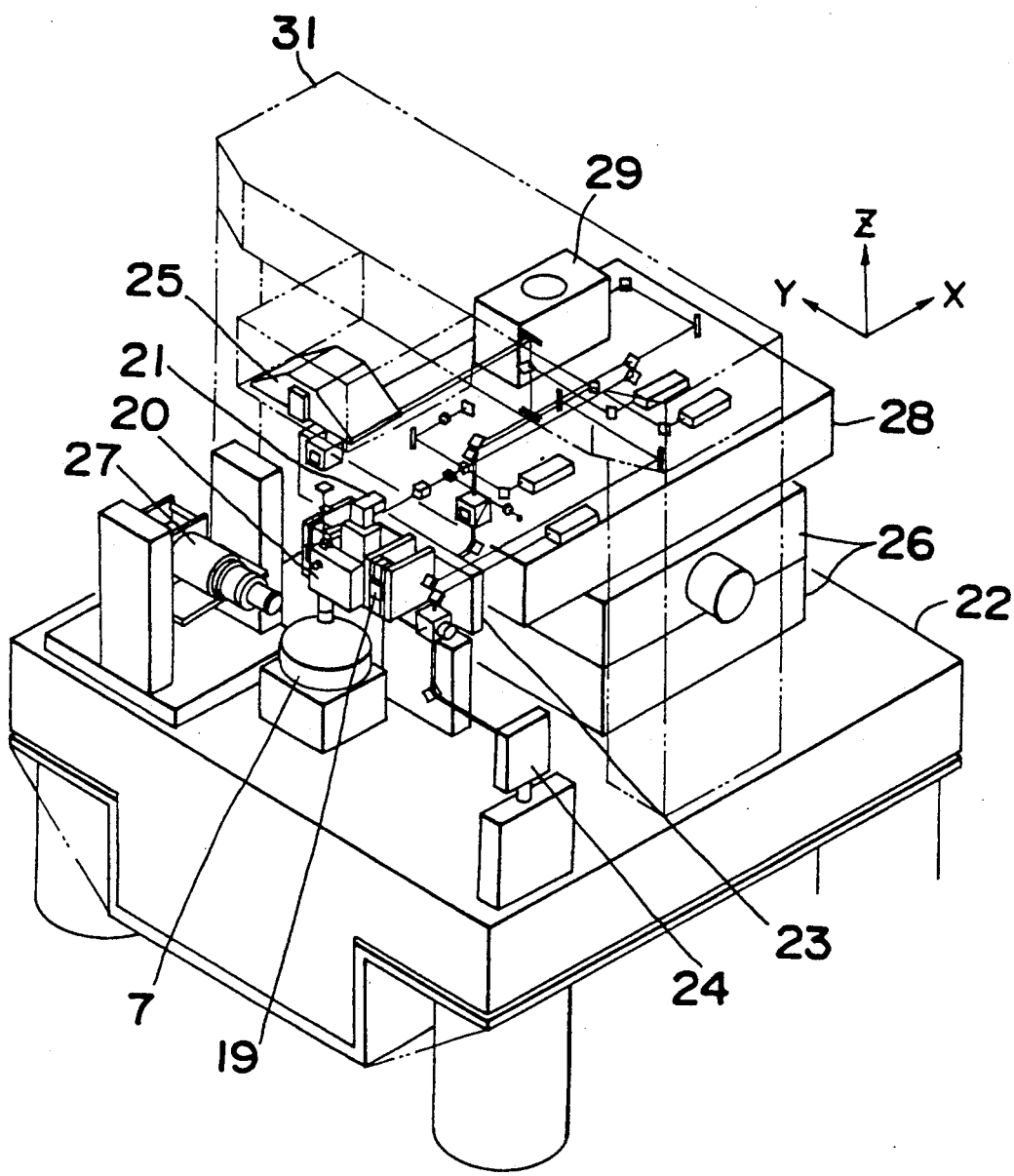
FIG. 4 is a diagram showing the structure of a three-dimensional measuring apparatus including the optical system and the control system of FIGS. 1-3.

FIG. 3 is a structural block diagram of a focus servo signal system. A differential circuit 16 obtains an error signal from outputs of the photodetectors 12 and 15. A servo circuit 17 adjusts a gain for phase compensation or to compensate for the variation of the reflectivity of the measuring surface 7, then drives linear motors 19 via a driving circuit 18. As shown in FIG. 4, the linear motors 19 are fixed to both sides of an optical probe 20 and drive the optical probe 20 along each air slide 21. The slide 21 has a fixed stage 21a and a movable stage 21b moveable on the fixed stage 21a. The optical probe 20 is fixed on the movable stage 21b. Since the linear motors 19 drive the optical probe 20 from both sides of the optical probe 20, it hardly produces a torque to incline the optical probe 20 even when the up-and-down driving force is impressed to the optical probe 20.

FIG. 4 shows the overall structure of a three-dimensional measuring apparatus with the optical probe 20 mounted thereto. The object to be measured 7, x-axis, y-axis, and reference mirrors 23, 24, 25, an x-y stage 26, and an air spindle 27 are fixed onto a surface plate 22. The z-axis reference mirror 25 is mounted via a portal supporting member 31. A surface plate 28 on the x-y stage 26 is provided with a measuring optical system, the air slide 21 as a z-stage, and the optical probe 20.

A wave stabilizing Helium-Neon Zeeman laser 29 is installed in the measuring optical system. The light projected from the laser 29 is divided into x, y, and z directions. The x-axis and y-axis coordinates are measured from the distances to the x-axis and y-axis- reference mirrors 23, 24. The z-axis coordinates are measured by letting the Zeeman laser light pass through the optical probe 20 and further penetrate the wave dividing mirror 5 to be reflected by the measuring surface 7, or by a cat's eye 30 consisting of a lens and a mirror so that it is inserted to reflect the incident light in the direction of incidence (referring to FIG. 1).

Figure 5:
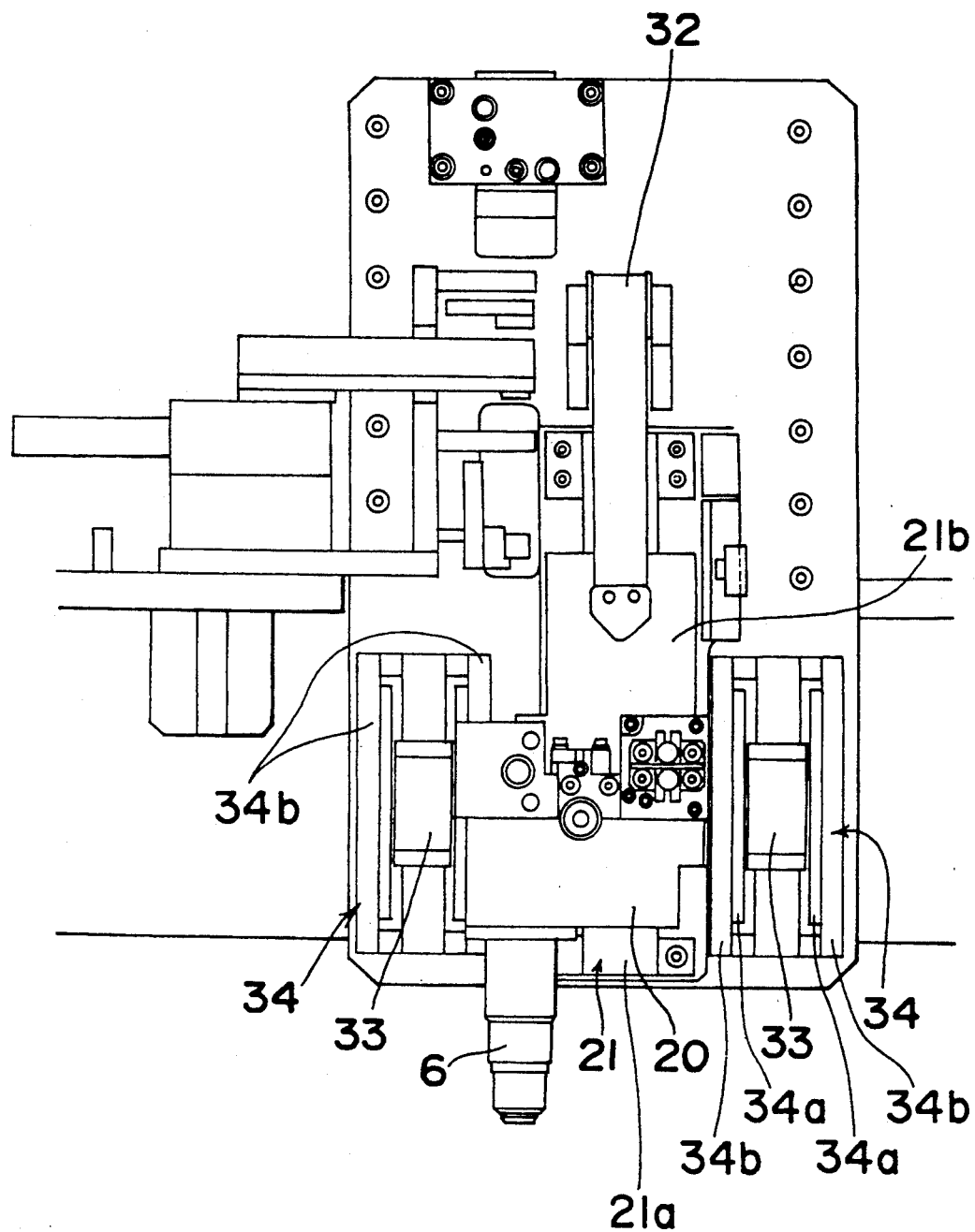
FIG. 5 is a diagram of the structure of a driving section of the optical probe including the optical system and the control system of FIGS. 1-4.

FIG. 5 shows z-axis a driving unit for the optical probe 20. The weight of the optical probe 20 is supported by a constant force spring 32 of a thin plate which is fixed onto the z-stage 21 and spirally wound. A supporting point of the constant force spring 32 is set in the vicinity of the center of gravity of a z-axis movable section including the optical probe 20. Since the tension of the constant force spring 32 is hardly changed even when the spring 32 is extended or contracted, only the weight of the movable section is supported by the constant force spring 32 over the 40 mm stroke in the z-axis direction.

Each linear motor 19 is formed of a magnetic circuit which consists of a coil 33 rigidly mounted at each side of the optical probe 20, magnets 34a, and yokes 34b. The driving circuit 18 allows the coils 33 to move along the yokes 34b in the z-axis direction to linearly move the optical probe 20 guided by the z-stage 21. At this time, the linear motors 19 drive the z-axis movable stage and the optical probe 20 to linearly move the optical probe 20, and produce a force for the optical probe 20 to track the measuring surface 7.

Figure 6:
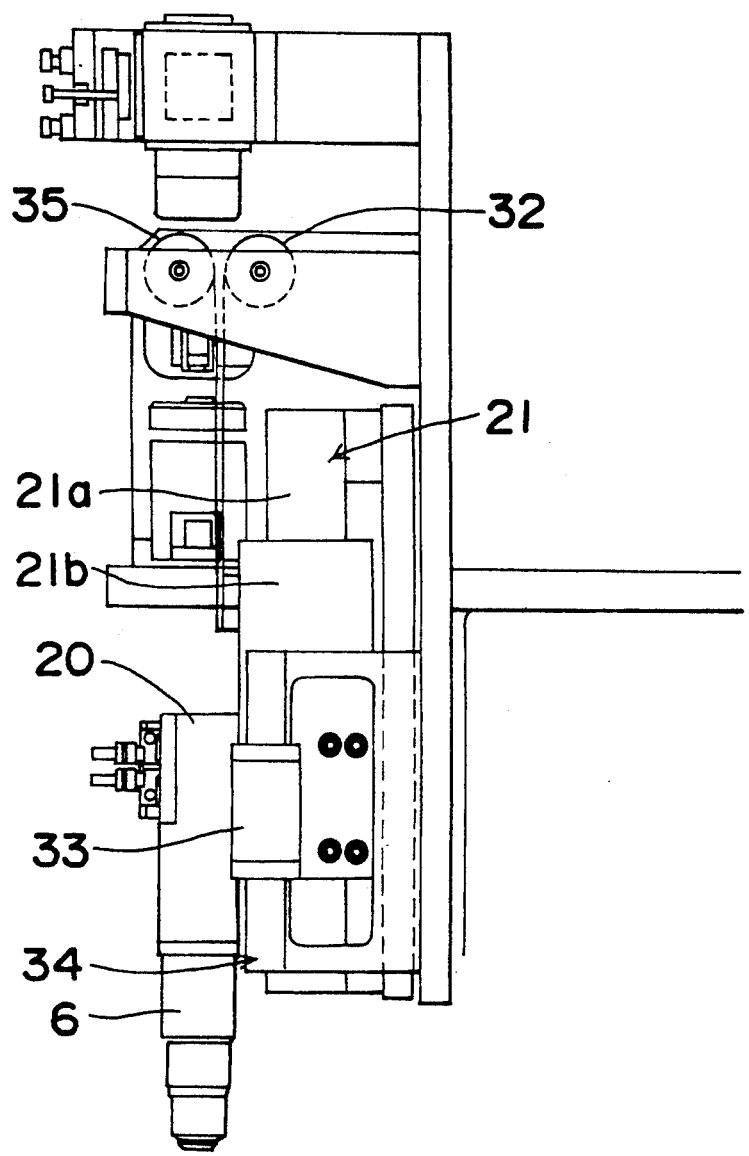
FIG. 6 is a side sectional view of the driving section of FIG. 5.

FIG. 6 is a side sectional view of the driving section in the z-axis direction of the optical probe 20. The constant force spring 32 may generate not only the tension in the z-axis direction, but a force in the winding direction thereof. The force towards the winding direction of the spring 32 is changed by the extension length of the spring 32. In the case where there is provided only one constant force spring 32, a force in the lateral direction of the z-stage 21 caused by the force towards the winding direction of the spring 32 is also generated to adversely influence the moving perpendicularity of the z-stage 21. Therefore, another confronting constant force spring 35 is preferably provided so as to remove the adverse influences and to achieve perpendicular movement of not larger than 50 nm by the z-stage 21.

Accordingly, the embodiment realizes a three-dimensional measuring apparatus capable of measuring the shape of an aspherical lens or the like with superhigh accuracy in a wide measuring range even when the surface of the lens is inclined in an arbitrary direction. The scientific and technological effect of the present invention is remarkable.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A three-dimensional measuring apparatus having an optical probe built therein, the optical probe comprising:
   a laser source;
   an objective lens for condensing a light from the laser source onto a surface to be measured;
   a first beam splitter for separating from an incident optical path a laser light reflected from the surface to be measured;
   a non-polarizing beam splitter for separating the separated light, separated by said first beam splitter, into two separated lights by a fixed separating ratio, independent of a direction of polarization;
   a first pin hole provided in front of a condensing point of one of the two separated lights separated by the non-polarizing beam splitter;
   a first photodetector for receiving the light passing through the first pin hole;
   a second pin hole provided behind a condensing point of the other of the two separated lights separated by the non-polarizing beam splitter;
   a second photodetector for receiving the light passing through the second pin hole;
   a driving means for driving the objective lens in accordance with a difference of outputs between the first and second photodetectors as an error signal for automatic focus control;
   a z-axis guide for guiding the optical probe in a z-axis direction; and
   wherein the driving means includes a linear driving means having coils mounted on both sides of the optical probe and generating a linear driving force in the z-axis direction when a current is fed to the coils so as to linearly move the optical probe guided by the z-axis guide in the z-axis direction, and a control means for feeding to the coils a control current corresponding to the error signal.

2. A three-dimensional measuring apparatus having an optical probe built therein, the optical probe comprising:
   a laser source;
   an objective lens for condensing a light from the laser source onto a surface to be measured;
   a first beam splitter for separating from an incident optical path a laser light reflected from the surface to be measured;
   a non-polarizing beam splitter for separating the separated light, separated by said first beam splitter, into two separated lights by a fixed separating ratio, independent of a direction of polarization;
   a first pin hole provided in front of a condensing point of one of the two separated lights separated by the non-polarizing beam splitter;
   a first photodetector for receiving the light passing through the first pin hole;

a second pin hole provided behind a condensing point of the other of the two separated lights separated by the non-polarizing beam splitter;

a second photodetector for receiving the light passing through the second pin hole;

a driving means for driving the objective lens in accordance with a difference of outputs between the first and second photodetectors as an error signal for automatic focus control;

a z-axis guide for guiding the optical probe in a z-axis direction; and a constant force spring for supporting the optical probe and generating a tension approximately equal to a weight of the optical probe over a movable range of the optical probe guided by the z-axis guide.

3. The three-dimensional measuring apparatus as claimed in claim 2, further comprising another constant force spring, arranged opposite the constant force spring, for supporting the optical probe and generating a tension approximately equal to a weight of the optical probe over a movable range of the optical probe guided by the z-axis guide, so that a sum of the tension of the two constant force springs is generated only in the z-axis direction.

4. A three-dimensional measuring apparatus having an optical probe built therein, the optical probe comprising:

a laser source;

an objective lens for condensing a light from the laser source onto a surface to be measured;

a first beam splitter for separating from an incident optical path a laser light reflected from the surface to be measured;

a non-polarizing beam splitter for separating the separated light, separated by said first beam splitter, into two separated lights by a fixed separating ratio, independent of a direction of polarization;

a first pin hole provided in front of a condensing point of one of the two separated lights separated by the non-polarizing beam splitter;

a first photodetector for receiving the light passing through the first pin hole;

a second pin hole provided behind a condensing point of the other of the two separated lights separated by the non-polarizing beam splitter;

a second photodetector for receiving the light passing through the second pin hole;

a z-axis guide for guiding the optical probe in a z-axis direction;

a driving means for driving the objective lens by a difference of outputs between the first and second photodetectors as an error signal for automatic focus control, the driving means including a linear driving means having coils mounted on both sides of the optical probe and generating a linear driving force in the z-axis direction when a current is fed to the coils so as to linearly move the optical probe guided by the z-axis guide in the z-axis direction, and a control means for feeding a control current corresponding to the error signal to the coils; and a constant force spring for supporting the optical probe and generating a tension approximately equal to a weight of the optical probe over a movable range of the optical probe guided by the z-axis guide.

5. The three-dimensional measuring apparatus as claimed in claim 4, further comprising another constant force spring, arranged opposite the constant force spring, for supporting the optical probe and generating a tension approximately equal to a weight of the optical probe over a movable range of the optical probe guided by the z-axis guide, so that a sum of the tension of the two constant force springs is generated only in the z-axis direction.

* * * * *